UNITED STATES PATENT OFFICE.

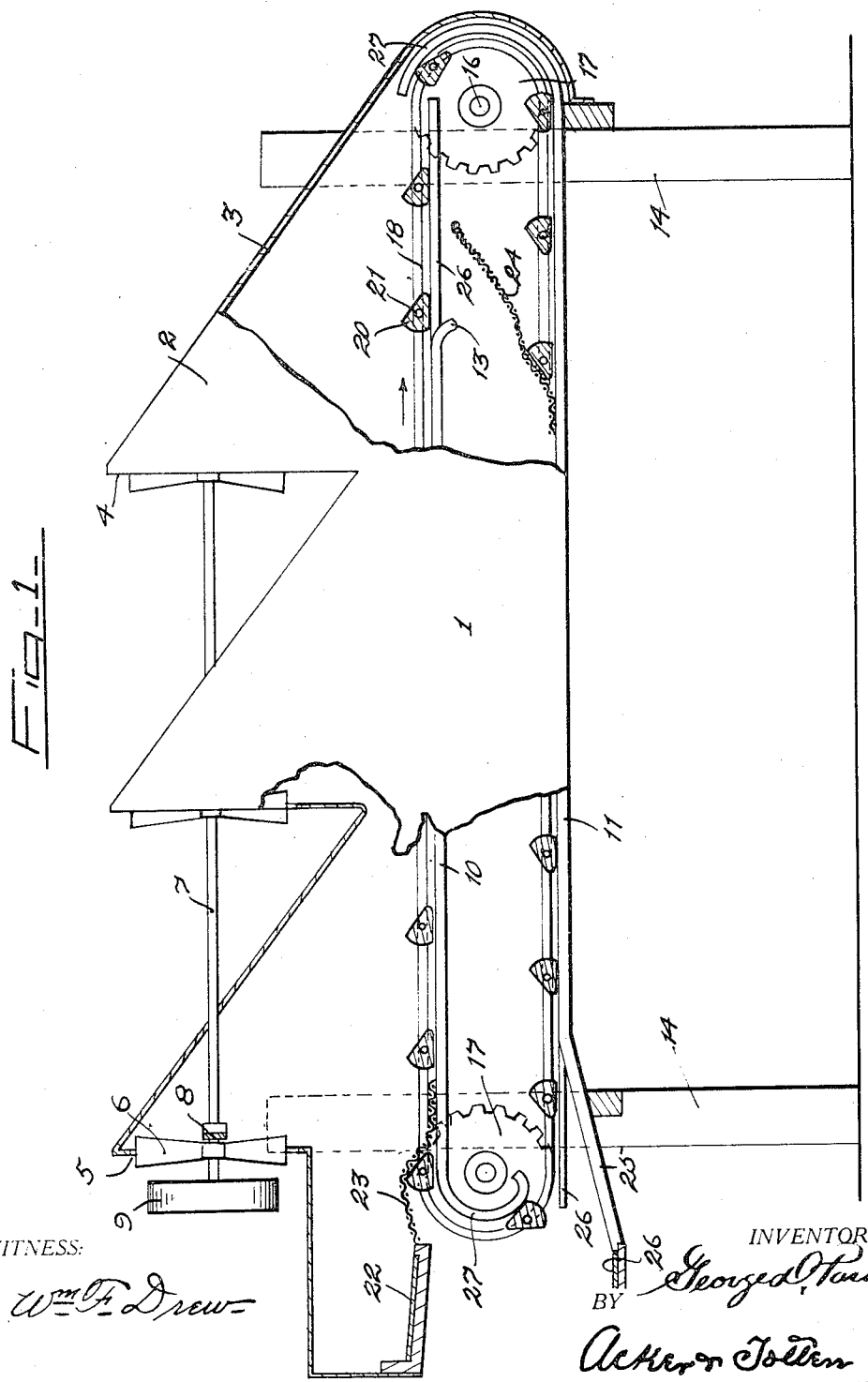

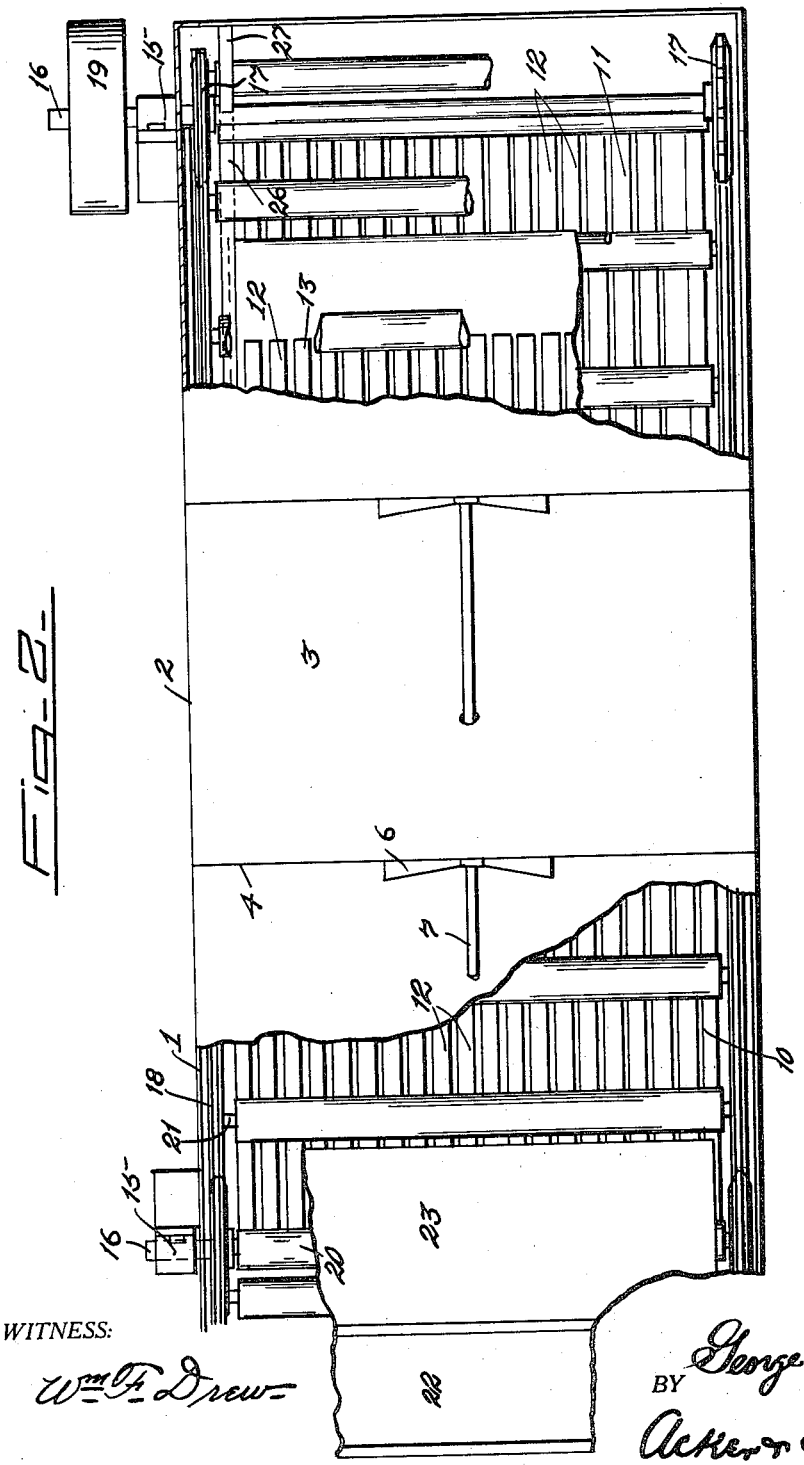

GEORGE D. PARKER, OF RIVERSIDE, CALIFORNIA.

CONVEYER FOR FRUIT-DRYING APPARATUS.

1,297,723.	Specification of Letters Patent.	Patented Mar. 18, 1919.

Application filed June 12, 1918. Serial No. 239,618.

*To all whom it may concern:*

Be it known that I, GEORGE D. PARKER, a citizen of the United States, residing at Riverside, in the county of Riverside and State of California, have invented certain new and useful Improvements in Conveyers for Fruit-Drying Apparatus, of which the following is a specification.

The present invention relates to improvements in fruit driers and more particularly to a type of conveyer adapted for use in driers where an endless conveyer is employed and the respective oppositely traveling flights thereof are utilized in the conveying of the fruit alternately in opposite directions through the drier, as set forth in my copending application Serial No. 233,096, filed May 7, 1918. The principal object of the invention is to provide a construction wherein the conveying members are so formed as to assist in rolling the fruit on the runways and which are adapted when traveling in either direction to present an inclined surface to the fruit for propelling the same.

With the above mentioned and other objects in view the invention consists in the novel construction and combination of parts hereinafter described illustrated in the accompanying drawings, and set forth in the claims hereto appended; it being understood that various changes in the form, proportion, size and minor details of construction within the scope of the claims may be resorted to without departing from the spirit or sacrificing any of the advantages of the invention.

Referring to the drawings forming a part of this specification,

Figure 1 is a broken longitudinal sectional view of the preferred embodiment of my invention.

Fig. 2 is a broken top plan view.

In the drawings wherein like characters of reference designate corresponding parts, 1 indicates a suitable drier housing, the upper wall of which consists of the hoods 2 each formed with the downwardly inclined top wall 3 and the vertical face 4. Each vertical face is provided with an opening 5 in which is mounted a fan 6 or other type of blower supported by a rotatable shaft 7, mounted in bearings 8. The shaft carries a band or driven wheel 9 adapted to receive power from any suitable source to simultaneously operate the fans and force air downwardly into the housing 1.

The housing is divided transversely into longitudinally disposed runways 10 and 11 by the parallel spaced longitudinally disposed slat members 12, the members forming the upper runway terminating as at 13 at a point short of the receiving end of the lower runway, 11.

Standards 14 support the housing 1, and to the same intermediate said runways 10 and 11 are secured the bearings 15, rotatably mounting horizontal shafts 16, said shafts carrying at their ends sprockets 17, around which pass the flexible conveyer forming members or chains 18. One of the shafts is provided with a band wheel 19 for receiving power from any suitable source to operate the conveyer in the direction of the arrow, Fig. 1 of the drawings. The conveyer forming members 18 are united at spaced intervals by the conveyer members 20 parallel spaced from each other, and each is provided at its end with a pin 21, received in the flexible conveyer forming members 18. The conveyer members 20 are substantially triangular in cross-section, and are arranged to present an upwardly inclined surface to the fruit when the conveyer is moving in the direction of the arrow, Fig. 1, in their travel longitudinally of the runways 11 and 12.

The fruit to be dried is conveyed to the drier housing in any suitable manner as by an endless belt 22, which discharges preferably onto a flexible fabric member 23 extending over the receiving end of the upper runway 10 and from the discharge end of said runway the partially dried fruit is discharged at the point 13 preferably onto another flexible fabric member 24 intermediate said runways 10 and 11 the free end of said fabric resting on the runway 11 and overlying the conveyer members 20. At the discharge end of said lower runway 11, the dried fruit is preferably discharged by gravity down an incline 25 onto any suitable discharge mechanism 26, such as an endless belt.

The points beyond the ends of the upper runway 10 and lower runway 11, extend the guide rails 26 which support the conveyer members 21 until the same reach a point adjacent the sprockets 17 at which time they are directed by suitable curved guide rails 27, to position a flat face thereof parallel with the surface of the runway with which said conveyer members are about to coöperate.

It will thus be apparent by forming the conveyer members substantially triangular in cross-section with the apex of said triangular portion in the direction of travel of the conveyer, the fruit as supported by said runways will be propelled longitudinally thereof in the direction of travel of the conveyer with the least possible resistance and said conveying members are adapted for reversing to present a like surface for propelling fruit longitudinally of the successive runways and provide an efficient conveyer for operating wherein both flights of an endless conveyer are employed in carrying fruit alternately in opposite directions within a drier for the drying thereof.

Having thus described my invention, what I claim as new and desire to protect by Letters Patent is:—

1. A fruit drier comprising a casing formed with a plurality of superimposed runways for supporting the fruit during the conveying and drying thereof, an endless traveling conveyer within the casing and arranged with successive flights operating one above each of said runways for conveying the fruit in opposite directions longitudinally of successive runways, said conveyer including a plurality of spaced pivoted conveyer bars extending transversely of said runways, and formed with adjacent edges angularly disposed relatively to each other to provide substantially flat surfaces for alternately resting on successive runways during the passage of the bars thereover, and a surface upwardly and rearwardly disposed relatively to the direction of travel of said conveyer.

2. A fruit drier comprising a casing formed with a plurality of superimposed runways for supporting the fruit during the conveying and drying thereof, an endless traveling conveyer within the casing and arranged with successive flights operating one above each of said runways for conveying the fruit in opposite directions longitudinally of successive runways, said conveyer including a plurality of spaced pivoted conveyer bars extending transversely of said runways, said bars provided with converging surfaces adapted for alternately resting on successive runways during the movement of said conveyer thereover, and alternately providing a surface upwardly and rearwardly disposed relatively to the direction of travel of said conveyer.

In testimony whereof I have signed my name to this specification in the presence of two subscribing witnesses.

GEORGE D. PARKER.

Witnesses:
CHAS. F. BROOKHART,
L. A. MARKS.